Dec. 10, 1968   A. SCARFI' ET AL   3,415,620
PROCESS FOR THE PRODUCTION OF POTASSIUM SULFATE
Filed May 17, 1967
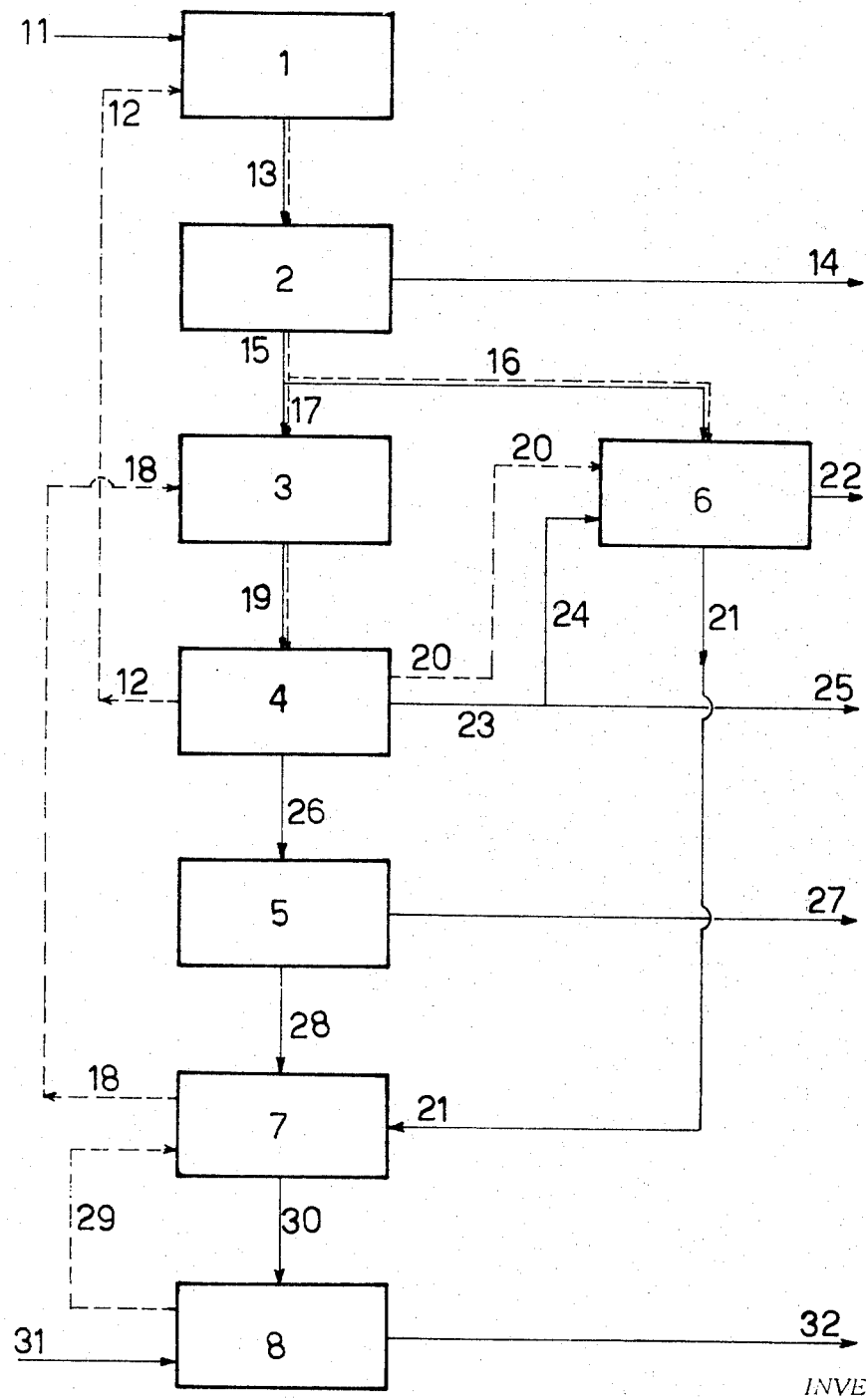
INVENTORS
Alberto Scarfi'
Emanuele Gugliotta
Stevens, Davis, Miller & Mosher
Attorneys

United States Patent Office 3,415,620
Patented Dec. 10, 1968

3,415,620
PROCESS FOR THE PRODUCTION OF
POTASSIUM SULFATE
Alberto Scarfì and Emanuele Gugliotta, Siracusa, Italy, assignors to Sincat Società Industriale Catanese S.p.A., Palermo, Italy
Filed May 17, 1967, Ser. No. 639,129
Claims priority, application Italy, May 18, 1966, 18,035
7 Claims. (Cl. 23—121)

ABSTRACT OF THE DISCLOSURE

Raw kainite is leached at temperatures greater than 90° C. with an epsomite brine into a langbeinite slurry, a portion of which is reacted with a schoenite brine, whereby there are obtained potassium chloride and epsomite which are separated from each other and an epsomite brine. A portion of the epsomite brine is recycled to the initial process step and another portion is reacted with the remainder of the langbeinite slurry and a portion of the epsomite, thus affording further langbeinite which is treated with a sulfate brine, whereby there are obtained a schoenite brine and schoenite which is reacted with potassium chloride and water to form potassium sulfate and a sulfate brine.

Background of the invention

This invention relates to a process for the production of potassium sulfate, more particularly, it relates to a process for the production of potassium sulfate from raw kainite ore.

It is known that kainite ore always contains considerable quantities of sodium chloride; the NaCl content of this ore generally ranges from 20% to 40% by weight. To avoid that the potassium sulfate and the other salts obtainable from kainite be contaminated by sodium salts, it is therefore necessary to eliminate most of the sodium chloride contained in the kainite before or during the processing of same.

The technique most commonly used for this purpose consists in the flotation of ground kainite ore; kainite undergoes flotation by use of suitable collecting agents, while most of the sodium chloride remains in the flotation wastes. The kainite beneficiated through flotation generally still contains about 5% by weight of NaCl.

This preliminary flotation operation is very expensive but so far has been deemed unavoidable, as other processes of equal technical validity were not known for separating the sodium chloride.

Our Italian Patent No. 672,661 describes a process for obtaining salts of potassium and magnesium from kainite. According to said process, kainite is leached, at temperatures higher than 90° C., with brines having a suitable composition, the result being the obtaining of langbenite. This langbeinite is cooled in the presence of its mother liquor, to temperatures lower than 40° C.; according to the final concentration of the brine by magnesium chloride and according to the saturation conditions by potassium chloride and magnesium sulfate, said cooling permits the formation of: (1) schoenite (or leonite) and potassium chloride; or (2) schoenite (or leonite) and $MgSO_4 \cdot 7H_2O$, or (3) potassium chloride and $$MgSO_4 \cdot 6H_2O$$

and/or $MgSO_4 \cdot 7H_2O$.

This process permits one to obtain best yields of potassium, as the brines in equilibrium with the salt mixtures obtained through the cooling action have a low content of potassium; this is due to the high magnesium content of said brines. This high $MgCl_2$ content exhibits, moreover, another important consequence; it greatly limits the solubility of sodium chloride in the brines. The quantity of sodium chloride which can be eliminated from the operational cycle through the drained brines is consequently very limited, therefore, also the quantity of NaCl which can be introduced into the operational cycle with kainite is very limited, otherwise potassium and magnesium salts are contaminated with sodium salts. In practice, the kainite entering the cycle cannot contain more than 2.5% sodium chloride, when langbeinite is converted into KCl and $MgSO_4 \cdot 6H_2O$ and/or $MgSO_4 \cdot 7H_2O$, while the same kainite cannot have more than 5% sodium chloride when langbeinite is converted into schoenite and KCl or schoenite and $MgSO_4 \cdot 7H_2O$.

The result is therefore that the technique of preliminary flotation cannot itself afford a beneficiation sufficient to allow the processing of kainite according to the high potassium yield process described in Italian Patent No. 672,661, when a conversion of langbeinite into KCl and $MgSO_4 \cdot 6H_2O$ and/or $MgSO_4 \cdot 7H_2O$ is to be attained. When, on the contrary, langbeinite is, again according to said above patent, to be converted into schoenite and KCl or epsomite, the top beneficiation of the kainite obtainable through flotation strictly corresponds to the process requirements which impose a very careful flotation.

The same patent also describes an alternative to the preliminary flotation of kainite; the langbeinite obtained through hot leaching of raw kainite can be converted by cold process into a mixture of KCl, NaCl and $$MgSO_4 \cdot 6H_2O$$

and/or $MgSO_4 \cdot 7H_2O$. The magnesium sulfate can be separated from the chlorides through classification or screening, and the potassium chloride can be separated from the sodium chloride through flotation. This latter operation permits one to obtain potassium chloride containing less than 5% by weight of NaCl. This flotation, carried out within the cycle, is, however, rather expensive due to the large quantity of the actual sodium chloride; the weight ratio between KCl and NaCl is in fact generally about 0.5. To avoid the contamination of magnesium sulfate due to NaCl, it is moreover necessary to have the ore ground to a degree of fineness higher than that required for a hot leaching operation. The sodium chloride present in the kainite ore submitted to grinding sufficient for the leaching operation contains in fact a significant percentage of relatively large crystals. As the granulometry of sodium chloride practically undergoes no modification through the various process stages, the bigger crystals are found in the classified magnesium sulfate. It is therefore necessary to care for a more effective grinding of the ore, such as to reduce granulometry of the sodium chloride: this consequently involves a more expensive grinding operation.

An object of this invention is to obtain potassium sulfate from kainite and using a process affording a very high yield of potassium.

Another object of this invention is to obtain potassium sulfate from kainite only, without having to resort to any external source of potassium chloride.

A further object of this invention is to obtain potassium sulfate from raw kainite, without having to resort to any preliminary beneficition of the ore through flotation.

A still further object of this invention is to eliminate most of the sodium chloride through very simple and inexpensive operations carried out during the process cycle.

The invention

These and still other objects are achieved through the process of this invention and according to which it is possible to obtain potassium sulfate from raw kainite through the following process stages:

(1) The ground raw material undergoes leaching, at a temperature higher than 90° C., with recycling epsomite brine obtained at stage 3; consequently one obtains a langbeinite slurry consisting of a solid phase, containing langbeinite and sodium chloride, and a langbeinite brine, (2) The langbeinite slurry is subjected to classification through which most of the sodium chloride is separated from said slurry, (3) A first part of the classified langbeinite slurry is cooled to a temperature ranging from 35° C. to 20° C., in the presence of a schoenite brine coming from stage 7, consequently one obtains a solid phase consisting of a mixture, including KCl, NaCl, $MgSO_4.6H_2O$ and/or $MgSO_4.7H_2O$ and an epsomite brine, (4) The magnesium sulfate is separated from the chlorides through classification or screening while the epsomite brine is partially conveyed to stage 6 and partially recycled to stage 1. The magnesium sulfate is partially conveyed to stage 6 and partially removed from the cycle, (5) The potassium chloride is separated through flotation from the sodium chloride, (6) The second part of the langbeinite slurry is subjected to a treatment at temperatures higher than 80° C. with a part of the epsomite brine obtained at stage 4 and a part of the magnesium sulfate obtained at stage 4.

A reaction between the brine and the magnesium sulfate takes place and the potassium still present in the brine is partially recovered, said potassium precipitating in the form of metastable langbeinite (i.e. langbeinite obtained according to a metastable equilibrium, as further explained in more detail), while the sodium chloride present in the incoming langbeinite dissolves. At the end of the operation a solid phase, consisting of langbeinite which is conveyed to stage 7, and a metastable langebinite brine, which is conveyed to drainage—are obtained, (7) The langbeinite obtained at stage 6 is treated, at a temperature comprised between 20° C. and 40° C., with the sulfate brine obtained at stage 8, with consequent obtaining of a solid phase, consisting of schoenite (or leonite) and potassium chloride, and a schoenite brine which is recycled at stage 3, (8) The schoenite and the potassium chloride obtained at stage 7 are reacted with the potassium chloride obtained at stage 5, in the presence of water, with consequent obtaining of potassium sulfate and a sulfate brine which is recycled at stage 7.

This invention permits one to obtain very high yields of potassium sulfate; said yield, calculted according to the ratio between $K_2O$ leaving the cycle in the form of $K_2SO_4$ and $K_2O$ entering the cycle in the form of kainite, generally ranges from 87% to 90%.

This yield is clearly and significantly higher than the yields afforded by most of the common processes for the production of potassium sulfate from kainite, i.e., the process of a linked conversion and the proces of a conversion followed by metathesis. The linked conversion process, which is based on the conversion of kainite into schoenite and following conversion of the schoenite into $K_2SO_4$, and does not require any external bringing in of KCl, generally affords a potassium yield of about 60%, calculated according to the ratio between $K_2O$ leaving the cycle in the form of $K_2SO_4$ and the $K_2O$ coming into cycle as kainite. The conversion and metathesis process, which is based on the conversion of kainite into schoenite and following metathesis between schoenite and KCl introduced into the cycle, affords a potassium yield generally ranging from 70% to 75%, calculated according to the ratio between $K_2O$ leaving the cycle in the form of $K_2SO_4$ and $K_2O$ coming into the cycle as kainite and KCl.

According to this invention, it has in fact been found that a very high yield of $K_2SO_4$ can be obtained from kainite only and by carrying out particularly combined operations. The langbeinite slurry obtained by hot process is firstly divided in two parts. The first part is submitted to conversion to KCl and epsomite (or $MgSO_4.6H_2O$).

The second part is submitted to conversion to schoenite and KCl. By permitting the KCl obtained from one part to react through a metathesis operation with the schoenite and the KCl obtained from the other part, $K_2SO_4$ is obtained. The brine to be drained, i.e., a part of the epsomite brine, is a brine with a very low potassium content; it moreover undergoes a further process for the purpose of recovery of the potassium therein contained. Among the three types of brine which can be obtained through conversion by cold process of the langbeinite obtained by hot process (i.e. mother liquors from the conversion to schoenite and KCl, mother liquors from the conversion to schoenite and $MgSO_4.7H_2O$, mother liquors from the conversion to KCl and $MgSO_4.6H_2O$ and/or $$MgSO_4.7H_2O)$$

the third type, viz., the epsomite brine, has the highest content of $MgCl_2$ and consequently the lowest content of potassium; the choice of this brine as brine to be drained is therefore very advantageous as to the yield of potassium. The brines in equilibrium with a solid phase consisting of KCl and $MgSO_4.6H_2O$ and/or $MgSO_4.7H_2O$ have in fact a content of magnesium chloride (ranging from 52 to 65 moles per 1000 moles water) clearly higher than the already high content (ranging from 45 to 52 moles per 1000 moles water) of the brine in equilibrium with a solid phase consisting of schoenite and KCl or schoenite and $MgSO_4.7H_2O$.

The further beneficition of the epsomite brine to be drained is carried out through a process being the object of our Italian Patent No. 729,475. According to said process, most of the potassium contained in the mother liquors and the waste brines coming from the process of the potassium salts, is recovered by permitting said brines to react at temperatures of at least 60° C. with anhydrous $MgSO_4$, $MgSO_4.6H_2O$ or $MgSO_4.7H_2O$. Under these conditions most of the potassium, contained in the brine, precipitates in the form of metastable kainite when the process is carried out at a temperature between 60° C. and 80° C. or in the form of metastable langbeinite when the process is carried out at a temperature above 80° C.

According to this invention said recovery process has been found advantageous for partially precipitating potassium in the form of metastable langbeinite as:

(1) The langbeinite slurry coming from the hot classification stage, has a temperature higher than 90° C.; it therefore already contains part of the heat necessary to carry out the recovery process, the calories required for the process are therefore only the calories necessary to heat the epsomite and the epsomite brine as well as those necessary for carrying out the reaction which is an endothermic one, (2) The process cycle provides at stage 4, the hexahydrate and heptahydrate magnesium sulphate necessary for the operation, (3) The metastable langbeinite obtained in this way unites with the langbeinite obtained in the first stage and can therefore be processed therewith in the stage for the conversion to schoenite and KCl.

The langbeinite obtained by the leaching of kainite is divided between the operation for the conversion to KCl and epsomite and the operation for the conversion to schoenite and KCl, also keeping into account the obtaining of langbeinite during the stage for the recovery of the potassium, in such a way as to obtain quantities of schoenite and KCl on the whole necessary for metathesis.

The operation for the recovery of potassium has a fundamental importance, as will be seen hereinafter, as to what relates with a further characteristic of this invention, namely the elimination of the sodium chloride.

The sodium chloride is, according to this invention, driven away from the cycle via three operations carried out at three different stages: the hot classification of all the langbeinite slurry, the subsequent washing of a part of the langbeinite slurry, the flotation of the KCl coming from the processing of the other part of the langbeinite slurry.

It has been in fact found that the langbeinite obtained by hot leaching appears in the form of small crystals which can be readily separated from most of the sodium chloride through a simple classification operation. It is in this way possible to eliminate the sodium chloride, present in the langbeinite slurry, in an amount from 70% up to 80%.

The small crystals of sodium chloride remain in the langbeinite slurry.

The same can be therefore found again in the mixture of KCl and hexahydrate or heptahydrate magnesium sulfate obtained by processing a part of the langbeinite slurry; during the cold classification or screening, said crystals pass through together with the potassium chloride and a small quantity of magnesium sulfate. A subsequent flotation allows one to easily separate the potassium chloride from the residual sodium chloride and magnesium sulfate which are driven away from the cycle.

The part of the langbeinite slurry intended for the conversion to schoenite is, on the contrary, purified in another way; it has been found that the epsomite brine fed to the stage for the recovery of the potassium undergoes a profitable transformation during the same stage; owing to the dissolving of hexahydrate or heptahydrate magnesium sulfate and the precipitation of langbeinite, its composition is modified and acquires remarkable solvent capacity against sodium chloride: thanks to such a solvent capacity, it is possible to dissolve the sodium chloride still carried by the langbeinite. The latter part of the sodium chloride is therefore ejected from the cycle by conveying the metastable langbeinite brine to the waste drain.

The langbeinite slurry obtained through the hot leaching of the kainite has a brine content of about 70% by weight. The slurry can be divided into two parts having an equal brine content; one part is intended for the production of KCl and epsomite, while the other part is intended for the production of KCl and epsomite, while the other part is intended for the washing stage of the langbeinite and the recovery of potassium. It is, however, preferred to lead a slurry with a smaller brine content to said last stage. According to a preferential embodiment of this invention, the slurry led to the washing stage of langbeinite contains from 40% to 60%, preferably about 50% by weight of brine. To reach such a content the slurry is, for example, decanted in such manner as to obtain a bottoms portion containing about 50% solid substances and an upper portion consisting of brine.

A part of the concentrated slurry is led to the stage, where the washing of the langbeinite takes place, while the remaining part is combined with the brine and led to the conversion stage to KCl and $MgSO_4 \cdot 6H_2O$ and/or $MgSO_4 \cdot 7H_2O$.

The various stages of the process of this invention are hereinunder described in better detail with reference to the sole figure of drawing diagrammatically illustrating the proposed process.

The continuous lines in said figure refer to the solid phases, while the dashed lines refer to the brines.

First stage—Leaching of the kainite

The raw kainite ore is crushed to pieces dimensioned less than the values included between 1 and 10 mm. The ore is preferably crushed to pieces dimensioned less than the values included between 5 and 8 mm.

Crushed ore 11 is led to leaching phase 1 together with a part 12 of epsomite brine 19 formed in stage 3.

The leaching temperature is higher than 90° C., preferably about 100° C.

Second stage—Classification of the langbeinite

Langbeinite slurry 13 obtained at stage 1 and consisting of langbeinite, sodium chloride and langbeinite brine, is conveyed to classification stage 2.

This operation is carried out in such a way as to separate the solid substances with dimensions higher than the values included between 35 and 60 mesh and preferably higher than values included between 35 and 48 mesh. (The mesh sizes are always referred to the Tyler scale.) The coarse fraction 14 containing most of the sodium chloride, is driven away from the cycle. The fine fraction 15 contains the remainder of the langbeinite slurry, viz., langbeinite, the fine part of the sodium chloride and the langbeinite brine.

This slurry is preferably concentrated, for example, by decantation in order to obtain a concentrate preferably containing about 50% solid substance and an upper portion consisting of brine. A portion 16 of the concentrated slurry is conveyed to stage 6 where the langbeinite is washed and the potassium recovered. The remaining part is collected together with the brine; diluted slurry 17 obtained in this way is conveyed to stage 3 where the langbeinite is converted to potassium chloride and epsomite (or $MgSO_4 \cdot 6H_2$).

If no concentration is carried out, slurry 15 is divided in two parts 16 and 17 with an equal brine content.

Third stage—Conversion of the langbeinite to potassium chloride and epsomite

Part 17 of the langbeinite slurry is collected together with schoenite brine 18 and cooled at stage 3 to a temperature comprised between 35° C. and 20° C. This cooling is preferably carried out in consecutive stages in order to achieved best conditions for the heat recovery.

A mixture of KCl, NaCl and $MgSO_4 \cdot 6H_2O$ and/or $MgSO_4 \cdot 7H_2O$ is obtained in this manner. If the operation temperature is close to the lower limit of the above said range, i.e. 20° C., the magnesium sulfate tends to precipitate in the form of epsomite: if the temperature is close to the upper limit, $MgSO_4 \cdot 6H_2O$ tends to precipitate. It is preferable to process at about 20° C., in a way that the magnesium sulfate precipitates in the form of epsomite.

Fourth stage—Screening or cold classification

Slurry 19, obtained at stage 3, undergoes in stage 4 a screening or classification process. This screening is commonly carried out by means of a screen with 28 to 60 mesh but preferably 28 to 35 mesh.

Top screening 23, consisting of $MgSO_4 \cdot 6H_2O$ and/or $MgSO_4 \cdot 7H_2O$ is divided into two parts; the first part 25 is driven away from the cycle while the second part 24 is conveyed to stage 6.

The chlorides are separated from the epsomite brine which is divided in two parts; first part 12 is recycled to stage 1, while second part 20 is conveyed to the langbeinite washing stage 6 and the potassium recovery.

35% to 40% of the epsomite brine is preferably conveyed to stage 6.

Fifth stage—Flotation of the potassium chloride

Mixture 26 of potassium chloride and sodium chloride is conveyed to stage 5 where the flotation of the potassium chloride takes place. Fatty amines are preferably used as flotation agents.

Flotation wastes 27, mainly consisting of sodium chloride, are conveyed to drainage.

Sixth stage—Washing of the langbeinite and recovery of the potassium

Part 16 of the langbeinite slurry, preferably concentrated as at point 2, is collected together with a part 20 of the epsomite brine and treated at temperatures higher than 80° C. with a part 24 of the hexahydrate or heptahydrate magnesium sulfate coming from stage 4. It is preferable to process at temperatures ranging from 95° C. to 105° C. A part of the potassium present in the brine precipitates during this stage in the form of metastable langbeinite while the sodium chloride brought in together with the langbeinite slurry dissolves.

At the end of the operation, metastable langbeinite brine 22 is sent to drainage while langbeinite 21 is conveyed to stage 7 for the conversion to schoenite.

The langbeinite is preferably separated from its brine through simple decantation in such manner as to obtain a concentrated bottoms fraction with about 40% to 60% of brine and the concentrated metastable langbeinite slurry 21 obtained in such a way is conveyed to stage 7.

Seventh stage—Conversion of the langbeinite into schoenite

Langbeinite or concentrated metastable langbeinite slurry 21 is conveyed to the conversion to schoenite stage 7 together with sulfate brine 29 coming from stage 8 and is cooled to a temperature comprised between 35° C. and 20° C. The process is preferably carried out at about 20° C. A solid phase 30, consisting of schoenite and KCl, and a schoenite brine 18, which is recycled to phase 3, are obtained at the end of this operation.

Eighth stage—Metathesis

Mixture 30 of schoenite and KCl, obtained at stage 7, is reacted with the flotation potassium chloride obtained at stage 5, in the presence of water 31, at a temperautre comprised between 20° C. and 40° C. but preferably 30° C.

Instead of conveying flotation potassium chloride 28 to stage 8, it is preferable to convey it to conversion stage 7, as the enclosed figure depicts; in this case solid mixture 30, obtained at the end of stage 7, contains all the potassium chloride and all the schoenite wanted for metathesis stage 8.

Potassium sulfate 32 and sulfate brine 29 are obtained after the metathesis operation; said brine is recycled to stage 7.

For the purpose of controlling the composition of the brines used in the various operational stages in such manner as to bring them to the degree of concentration deemed best for every stage, it is possible to modify the content of the brine entering every stage by adding water thereto in such quantity to bring the brine to a pre-established optimum content. Said additions are not absolutely necesssary but allow one to steadily maintain the best process conditions as to the kinetics and the yield of every operation.

These additions also permit one to easily adjust the process conditions to any variation in kainite content of the incoming ore; the concentrations of the various brines can be thus maintained at optimum values in spite of the variations occuring in the characteristics of the incoming ore.

In order to further illustrate the present invention and the advantages thereof, the following specific examples are given, it being understood that the same are merely intended to be illustrative and not limitative.

EXAMPLE 1

(1) Leaching of the kainite ore at 100° C.—100 gr. kainite ore are crushed to 6 mm. pieces and, consisting of 66.39 gr. kainite and 33.61 gr. NaCl, were treated for one hour contact time at 100° C. with 87.30 gr. recycled brine coming from stage 3.

39.77 gr. langbeinite, 30.68 gr. NaCl, 1.99 gr. unconverted kainite and 114.86 gr. langbeinite brine were obtained.

(2) Classification and concentration of the langbeinite slurry at 100° C.—187.30 gr. langbeinite slurry obtained from stage 1 were graded at 35 mesh in a classifier.

26.37 gr. classification wastes were obtained as coarse fraction of the classification, after centrifugation and washing, said wastes consisting of 1.99 gr. kainite and 24.38 gr. NaCl while 160.93 gr. langbeinite slurry, consisting of 39.77 gr. langbeinite, 6.30 gr. NaCl, 114.86 gr. langbeinite brine, were obtained as fine fraction.

Said langbeinite slurry underwent decantation at 100° C. 85.84 gr. concentrated bottoms and 75.09 gr. upper portion, mainly consisting of langbeinite brine, were obtained after decantation.

(3) Decomposition to KCl and MgSO$_4$·7H$_2$O at 20° C.—75.09 gr. langbeinite brine and 51.14 gr. concentrated langbeinite slurry (23.69 gr. langbeinite, 23.69 gr. brine, 3.76 gr. NaCl) were cooled in consecutive stages to 20° C. together with 70.42 gr. schoenite mother liquor, coming from stage 7 and 2.47 gr. of water. The obtained slurry was conditioned for four hours at 20° C.

14.64 gr. KCl, 9.01 gr. NaCl, 39.07 gr. MgSO$_4$·7H$_2$O and 136.40 gr. epsomite mother liquor were obtained.

(4–5) Screening and flotation at 20° C.—The slurry obtained at stage 3 (199.12 gr.) was screened at 28 mesh to eliminate as top screening most of the magnesium sulfate which, after centrifugation and washing, amounted to 29.30 gr.

The bottom screening consisted of 14.64 gr. KCl, 9.01 gr. NaCl, 9.77 gr. MgSO$_4$·7H$_2$O and 136.40 gr. epsomite mother liquor.

17.29 gr. sylvite concentrate (14.20 gr. KCl, 3.09 gr. NaCl) and 16.13 gr. wastes (9.77 gr. MgSO$_4$·7H$_2$O, 5.92 gr. NaCl, 0.44 gr. KCl) were obtained by flotation of the bottom screening. Said wastes were conveyed to drainage.

(6) Washing of the concentrated langbeinite slurry and recovery of the potassium.—34.70 gr. concentrated langbeinite slurry, coming from stage 2, were treated for 1 hour at 100° C. with 49.10 gr. epsomite mother liquor, 17.90 gr. MgSO$_4$·7H$_2$O and 3.34 gr. water.

20.29 gr. langbeinite and 84.72 gr. langbeinite mother liquor, containing 0.89% potassium and 2.02% sodium by weight, were obtained. The langbeinite concentrated to 50% solid substances was conveyed to stage 7. The mother liquor (64.43 gr.) was drained from the cycle.

(7) Conversion of the langbeinite into schoenite at 20° C.—40.58 gr. concentrated langbeinite slurry containing 20.29 gr. langbeinite were treated with 17.29 gr. sylvitic concentrate, 58.31 gr. sulfate mother liquor coming from stage 8 and 0.57 gr. water.

The obtained slurry was conditioned for 3 hours at 20° C. 30.41 gr. schoenite, 15.94 gr. KCl and 70.42 gr. schoenite mother liquor were obtained and said mother liquor was recycled to stage 3.

(8) Metathesis at 30° C.—46.35 gr. solid substances coming from stage 7 were treated with 35.32 gr. water for 3 hours, at 30° C.

23.37 gr. humid K$_2$SO$_4$, with composition K 40.65, Mg 0.77; Cl 1.03, SO$_4$ 51.60, K$_2$O 5.95 by weight percent, and 58.31 gr. sulfate mother liquor were obtained after centrifugation. The sulfate mother liquor was recycled to stage 7.

22.68 gr. K$_2$SO$_4$ with K$_2$O content equal to 50.47% by weight were obtained after drying. The yield of potassium, calculated according to the ratio between K$_2$O leaving the cycle in the form of K$_2$SO$_4$ and K$_2$O entering the cycle in the form of kainite, was 89.52%.

EXAMPLE 2

(1) Leaching of the kainite ore at 100° C.—100 gr. kainite ore were crushed to 6 mm. pieces and consisting of 64.91 gr. kainite as well as 35.09 gr. NaCl, were treated for 1 hour contact time at 100° C. with 85.35 gr. of recycled brine coming from stage 3.

38.71 gr. langbeinite, 32.27 gr. NaCl, 1.95 gr. unconverted kainite and 112.42 gr. langbeinite brine were obtained.

(2) Classification of the langbeinite slurry at 100° C.—185.35 gr. langbeinite slurry obtained at stage 1 were graded at 35 mesh in a classifier.

After centrifugation and washing, 27.76 gr. classification wastes consisting of 1.95 gr. kainite and 25.81 gr.

NaCl were obtained as coarse fraction of the classification while 157.59 gr. langbeinite slurry, consisting of 38.71 gr. langbeinite, 6.46 gr. NaCl, 112.42 gr. langbeinite brine were obtained as fine fraction.

No concentrating of the slurry was carried out.

(3) Decomposition to KCl and $MgSO_4 \cdot 7H_2O$ at 20° C.—104.58 gr. langbeinite slurry coming from the classified fine fraction (25.69 gr. langbeinite, 4.28 gr. NaCl, 74.61 gr. brine) were cooled in consecutive stages to 20° C. together with 66.50 gr. schoenite mother liquor coming from stage 7 and 0.86 gr. water. The obtained slurry was conditioned for 4 hours at 20° C. 14.50 gr. KCl, 45.61 gr. $MgSO_4 \cdot 7H_2O$, 9.01 gr. NaCl and 102.82 gr. epsomite mother liquor were obtained.

(4–5) Screening and flotation at 20° C.—The slurry obtained at stage 3 (171.94 gr.) was screened at 28 mesh for eliminating as top screening most of the magnesium sulfate which after centrifugation and washing, turned out to amount to 34.21 gr.

The bottom screening consisted of 14.50 gr. KCl, 9.01 gr. NaCl, 11.40 gr. $MgSO_4 \cdot 7H_2O$ and 102.82 gr. epsomite mother liquor. 16.72 gr. sylvitic concentrate (13.75 gr. KCl, 2.97 gr. NaCl) were obtained by flotation of the bottom screening while wastes (0.75 gr. KCl, 6.04 gr. NaCl, 11.40 gr. $MgSO_4 \cdot 7H_2O$) were conveyed to drainage.

(6) Washing of the langbeinite slurry and recovery of the potassium.—52.99 gr. langbeinite slurry coming from stage 2 (13.02 gr. langbeinite, 2.18 gr. NaCl, 37.79 gr. langbeinite slurry) were treated for 1 hour contact time at 100° C., with 17.47 gr. epsomite mother liquor 23.28 gr. $MgSO_4 \cdot 7H_2O$ and 5.79 gr. water. 18.84 gr. langbeinite and 80.67 gr. langbeinite mother liquor, were obtained.

The langbeinite, concentrated to 50% solid substances, was conveyed to stage 7.

61.83 gr. mother liquor, containing 0.98% potassium and 2.02% sodium by weight, were drained from the cycle.

(7) Conversion of the langbeinite to schoenite at 20° C.—37.68 gr. bodied up metastable langbeinite slurry containing 18.84 gr. langbeinite were treated with 16.72 gr. sylvitic concentrate coming from stage 5 and 56.04 gr. sulfate mother liquor coming from stage 7.

The obtained slurry was conditioned for 3 hours at 20° C. One obtains 28.27 gr. schoenite, 15.67 gr. KCl and 66.50 gr. schoenite mother liquor. Said mother liquor was recycled to stage 3.

(8) Metathesis at 30° C.—43.94 gr. solid substances coming from stage 7 were treated with 34.05 gr. water for 3 hours, at 30° C. 21.95 gr. humid $K_2SO_4$, with composition K 41.48, Mg 0.53, Cl 1.83, $SO_4$ 50.72, $H_2O$ 5.34 by weight percent, and 56.04 gr. sulfate mother liquor were obtained after centrifugation. The sulfate mother liquor was recycled to stage 6.

21.36 gr. $K_2SO_4$ with $K_2O$ equal to 51.47% by weight were obtained after drying. The yield of potassium, calculated as in Example 1, was 88.00%.

EXAMPLE 3

(1) Leaching of the kainite ore at 100° C.—100 gr. kainite ore, crushed to 6 mm. pieces and consisting of 70 gr. kainite, as well as 30 gr. NaCl, were treated for one hour contact time at 100° C. with 87.30 gr. recycled brine coming from stage 3.

41.93 gr. langbeinite, 27.16 gr. NaCl, 2.10 gr. kainite and 116.11 gr. langbeinite brine were obtained.

(2) Classification and concentration of the langbeinite slurry at 100° C.—187.30 gr. langbeinite slurry obtained from stage 1 were graded at 35 mesh in a classifier.

After centrifugation and washing 28.83 gr. classification wastes were obtained as coarse fraction, said wastes consisting of 21.73 gr. NaCl and 2.10 gr. unconverted kainite, while 163.47 gr. classified langbeinite slurry, consisting of 41.93 gr. langbeinite, 5.43 gr. NaCl, 116.11 gr. langbeinite brine were obtained as fine fraction.

The langbeinite slurry obtained coming from the fine fraction was decanted at 100° C. A concentrated bottoms (89.51 gr.) and an upper portion (73.96 gr.) mainly consisting of langbeinite slurry were obtained.

(3) Decomposition to KCl and $MgSO_4 \cdot 7H_2O$ at 20° C.—73.96 gr. langbeinite brine, going from the decanter upper portion and 53.55 gr. concentrated langbeinite slurry (25.36 gr. langbeinite, 2.70 gr. NaCl, 25.49 gr. brine) were cooled in consecutive stages up to 20° C. together with 73.10 gr. schoenite mother liquor, coming from stage 7, and 2.47 gr. water. The obtained slurry was conditioned for four hours at 20° C.

15.34 gr. KCl, 7.55 gr. NaCl, 42.37 gr. $MgSO_4 \cdot 7H_2O$ and 137.82 gr. epsomite mother liquor were obtained.

(4–5) The slurry obtained at stage 3 (203.08 gr.) was screened at 28 mesh for eliminating as top screening most of the heptahydrate magnesium sulfate which after centrifugation and washing turned amounted to 31.77 gr.

The bottom screening consisted of 15.34 gr. KCl, 6.55 gr. NaCl, 10.60 gr. $MgSO_4 \cdot 7H_2O$ and 137.82 gr. epsomite mother liquors. 17.69 gr. sylvitic concentrate (14.94 gr. KCl, 2.75 gr. NaCl) and 15.80 gr. wastes (10.60 gr. $MgSO_4 \cdot 7H_2O$, 4.80 gr. NaCl, 0.40 gr. KCl) were obtained by flotation of the bottom screening. Wastes were conveyed to drainage.

(6) Washing of the concentrated langbeinite slurry and recovery of the potassium.—35.96 gr. concentrated langbeinite slurry 16.57 gr. langbeinite, 2.73 gr. NaCl, 16.66 gr. brine) coming from stage 2, were treated for the contact time of one hour at 100° C. with 50.52 gr. epsomite mother liquor, 3.01 gr. water and 18.81 gr. $MgSO_4 \cdot 7H_2O$. 20.92 gr. langbeinite, 87.38 gr. langbeinite mother liquor, containing 0.92% potassium and 2.05 sodium by weight, were obtained. 66.46 gr. of mother liquor were drained, while the langbeinite concentrated to 50% solid substances was conveyed to phase 7.

(7) Conversion of the langbeinite to schoenite at 20° C.—41.84 gr. concentrated langbeinite slurry coming from stage 6 (20.92 gr. langbeinite, 20.92 gr. brine) were treated with 17.69 gr. sylvitic concentrate and 62.07 gr. sulfate mother liquor coming from stage 8.

The obtained slurry was conditioned for three hours at 20° C. 31.27 gr. schoenite, 17.23 gr. KCl and 73.10 gr. schoenite mother liquor were obtained. Said mother liquor was recycled to stage 3.

(8) Metathesis at 30° C.—48.50 gr. solid substances (31.27 gr. schoenite, 17.23 gr. KCl) coming from stage 7 were treated with 37.70 gr. water for three hours at 30° C.

24.13 gr. humid $K_2SO_4$, with composition K 41.57, Mg 0.53, Cl 1.60, $SO_4$ 51.00, $H_2O$ 5.30 by weight percent, and 62.07 gr. sulfate mother liquor were obtained after centrifugation. The sulfate mother liquor was recycled to stage 7.

23.49 gr. $K_2SO_4$ with $K_2O$ content equal to 51.44% were obtained after drying.

The yield of potassium afforded by the process and calculated as in Example 1, was 89.59%.

EXAMPLE 4

(1) Leaching of the kainite ore at 100° C.—100 gr. kainite ore crushed to 8 mm. pieces and consisting of 64.91 gr. kainite and 35.09 gr. NaCl were treated, for one hour contact time at 100° C., with 85.35 gr. recycled brine coming from stage 3.

38.70 gr. langbeinite, 32.40 gr. NaCl, 1.95 gr. unconverted kainite and 112.30 gr. langbeinite brine were obtained.

(2) Classifiication and concentrating of the langbeinite slurry at 100° C.—185.35 gr. langbeinite slurry, obtained at stage 1, were graded at 48 mesh in a classifier.

After centrifugation and washing 31.11 gr. classification wastes consisting of 29.16 gr. NaCl and 1.95 gr. kainite were obtained as coarse fraction of the classification while 154.24 gr. of classified langbeinite slurry, consisting of 38.70 gr. langbeinite, 3.24 gr. NaCl, 112.30 gr. langbeinite brine, were as fine fraction obtained. The langbeinite slurry underwent decantation at 100° C. 80.71 gr. concentrated bottoms and 75.53 gr. upper portion, mainly consisting of langbeinite brine, were obtained.

(3) Decomposition to KCl and $MgSO_4.7H_2O$ at 20° C.—73.53 gr. langbeinite brine and 48.17 gr. concentrated langbeinite slurry (23.10 gr. langbeinite, 23.14 gr. brine, 1.93 gr. NaCl) were cooled in consecutive stages to 20° C. together with 68.20 gr. schoenite mother liquor coming from stage 7 and 2.74 gr. $H_2O$. The obtained slurry was conditioned for four hours at 20° C.

14.84 gr. KCl, 6.53 gr. NaCl, 40.33 gr. $MgSO_4.7H_2O$ and 130.94 gr. epsomite mother liquor were obtained.

(4–5) Screening and flotation at 20° C.—The slurry obtained at stage 3 (192.64 gr.) was screened at 48 mesh for eliminating as top screening most of the magnesium sulfate which after centrifugation and washing amounted to 28.27 gr.

The bottom screening consisted of 12.06 gr.

$MgSO_4.7H_2O$ 14.84 gr. KCl, 6.53 gr. NaCl, 130.94 gr. epsomite mother liquor. 17.22 gr. sylvitic concentrate (14.34 gr. KCl, 2.88 gr. NaCl) and 16.49 gr. wastes (12.06 gr. $MgSO_4.7H_2O$, 0.50 gr. KCl, 3.65 gr. NaCl) were obtained by flotation of the bottom screening. Said wastes were conveyed to drainage.

(6) Washing of the concentrated langbeinite slurry and recovery of the potassium.—32.54 gr. concentrated langbeinite slurry (15.60 gr. langbeinite, 15.63 gr. slurry, 1.31 gr. NaCl) coming from stage 2 were treated, for one hour contact time at 100° C., with 4.04 gr. $H_2O$, 17.74 gr. $MgSO_4.7H_2O$ and 45.59 gr. epsomite mother liquor. 19.71 gr. langbeinite and 80.21 gr. metastable langbeinite mother liquor containing 0.89% potassium and 1.48% sodium by weight, were obtained.

60.78 gr. of mother liquor were drained, while the concentrated langbeinite was recycled to stage 7.

(7) Conversion of the langbeinite to schoenite at 20° C.—39.14 gr. concentrated langbeinite slurry coming from stage 6 (19.71 gr. langbeinite, 19.43 gr. brine) were treated with 17.22 gr. sylvitic concentrate and 56.01 gr. sulfate mother liquor coming from stage 8. The obtained slurry was conditioned for three hours at 20° C. 28.24 gr. schoenite, 15.93 gr. KCl and 68.20 gr. schoenite mother liquor were obtained. Said mother liquor was recycled at stage 3.

(8) Metathesis at 30° C.—44.17 gr. solid substances coming from stage 7 (28.24 gr. schoenite, 15.93 gr. KCl) were treated with 34.03 gr. water for a contact time of three hours, at 30° C.

22.19 gr. humid $K_2SO_4$, with composition K 41.73, Mg 0.52, Cl 2.37, $SO_4$ 50.12, $H_2O$ 5.26 by weight percent, and 56.01 gr. sulfate mother liquor were obtained after centrifugation. The sulfate mother liquor was recycled to stage 7.

21.61 gr. $K_2SO_4$ with $K_2O$ content equal to 51.63% by weight were obtained after drying. The yield of potassium, calculated as in Example 1, was 89.22%.

Instead of dividing the langbeinite between the operations for the conversion to KCl and epsomite and the conversion to schoenite and KCl, in such manner to obtain the quantities of KCl and schoenite necessary for the metathesis to potassium sulfate, it is possible to convey a larger amount of langbeinite to the conversion process to KCl and epsomite, consequently affording an excess of KCl. It is in this way possible to produce KCl, besides $K_2SO_4$. It is also possible to permit the excess KCl, or a part of it, to react with a part of the hexahydrate or heptahydrate magnesium sulfate, in a way to obtain schoenite which is sent to the metathesis process together with the schoenite directly obtained through the conversion of the langbeinite to schoenite and KCl.

It is easy to understand that the use of different techniques for the hot separating of the coarse fraction, as for example by screening, cycloning or centrifugation, of most of the sodium chloride from the langbeinite, permits one to obtain equally good results, provided that said techniques are suitably applied.

As many apparently widely different embodiments of the present invention can be made without departing from the spirit and scope thereof, it is to be understood that the same is not intended to be limited to the specific embodiments thereof, except as defined by the appended claims.

What is claimed is:

1. A process for the production of potassium sulfate from crushed raw kainite, comprising:
   (a) leaching said crushed raw kainite at temperatures greater than about 90° C. by means of epsomite brine recycled from below stage (c) thus affording a langbeinite slurry comprising a solid phase containing langbeinite and sodium chloride, and langbeinite brine;
   (b) subjecting the said langbeinite slurry to classification and separating the bulk of the sodium chloride therefrom;
   (c) cooling a first portion of the said classified langbeinite slurry to a temperature of from between about 35° C. and about 20° C. in the presence of a schoenite brine recycled from below stage (g) thus affording a solid phase comprising a mixture of KCl, NaCl and a member selected from the group consisting of $MgSO_4.6H_2O$, $MgSO_4.7H_2O$ and mixtures thereof, and epsomite brine;
   (d) separating magnesium sulfate from chloride, partially conveying the epsomite brine to below stage (f) and partially recycling the same to above stage (a), partially conveying said magnesium sulfate to below stage (f) and partially expelling the same from the process cycle;
   (e) separating potassium chloride from sodium chloride via flotation;
   (f) treating a second portion of the said langbeinite slurry at a temperature greater than about 80° C. with a portion of the epsomite brine conveyed from above stage (d) and with a portion of the magnesium sulfate also conveyed from above stage (d) thus affording a solid phase comprising langbeinite which is conveyed to below stage (g) and metastable langbeinite brine which is conveyed to drainage;
   (g) treating the langbeinite conveyed from above stage (f) at a temperature from between about 35° C. and about 20° C. with the sulfate brine recycled from below stage (h) thus affording a solid phase comprising a member selected from the group consisting of schoenite and leonite, and potassium chloride, and schoenite brine which is recycled to above stage (c); and
   (h) reacting the schoenite and potassium chloride from above stage (g) with the potassium chloride obtained from above stage (e) in the presence of water thus affording the desired potassium sulfate and a sulfate brine which is recycled to above stage (g).

2. The process as defined by claim 1, wherein stage (d) the magnesium sulfate is separated by classification.

3. The process as defined by claim 1, wherein stage (d) the magnesium sulfate is separated by screening.

4. The process as defined by claim 1, wherein the raw kainite ore has been crushed to pieces of a size distribution of less than about 5 to 8 mm.

5. The process as defined by claim 1, wherein stage (b) langebinite is graded such as to separate solids having a size distribution of greater than about 35 to 48 mesh.

6. The process as defined by claim 3, wherein stage (d) the member selected from the group consisting of $MgSO_4.6H_2O$, $MgSO_4.7H_2O$ and mixtures thereof is separated from potassium chloride and sodium chloride by screening at a value ranging from between 28 to 35 mesh.

7. The process as defined by claim 1, wherein the langbeinite slurry is concentrated after the classification of stage (b) to obtain a thick slurry comprising from 40 percent to 60 percent brine, a portion of which thick slurry is conveyed to the langbeinite washing and potassium recovery stage, and a second portion of which is conveyed, together with the brine separated during concentration, to the stage for conversion to potassium chloride and to a member selected from the group consisting of $MgSO_4 \cdot 6H_2O$, $MgSO_4 \cdot 7H_2O$, and mixtures thereof.

References Cited

UNITED STATES PATENTS

| | | | |
|---|---|---|---|
| 2,849,287 | 8/1958 | Atwood et al. | 23—38 |
| 3,004,826 | 10/1961 | Marullo et al. | 23—38 |
| 3,058,806 | 10/1962 | Ebner | 23—121 |
| 3,243,259 | 3/1966 | Stein et al. | 23—121 |

OSCAR R. VERTIZ, *Primary Examiner.*

G. O. PETERS, *Assistant Examiner.*

U.S. Cl. X.R.

23—38

PO-1050
(5/69)

UNITED STATES PATENT OFFICE
CERTIFICATE OF CORRECTION

Patent No. 3,415,620     Dated December 10, 1968

Inventor(s) ALBERTO SCARFI and EMANUELE GUGLIOTTA

It is certified that error appears in the above-identified patent and that said Letters Patent are hereby corrected as shown below:

1. Column 1, line 57, change "langbenite" to --langbeinite--;

2. Column 5, lines 41-42, cancel "for the production of KCl and epsomite while the other part is intended";

3. Column 6, line 32, change "achieved" to --achieve--;

4. Column 9, line 36, change "0.98" to --0.89--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents